US010982986B2

(12) United States Patent
Bissen et al.

(10) Patent No.: US 10,982,986 B2
(45) Date of Patent: Apr. 20, 2021

(54) MICROMETERING PUMP (71) Applicant: RIPRUP Company S.A., St. Peter Port (GG)

(72) Inventors: Monique Bissen, Pforzheim (DE); Josef Schucker, Ronco Sopra Ascona (CH)

(73) Assignee: RIPRUP Company S.A., St. Peter Port (GG)

( * ) Notice: Subject to any disclaimer, the term of this patent is extended or adjusted under 35 U.S.C. 154(b) by 0 days.

(21) Appl. No.: 16/695,568

(22) Filed: Nov. 26, 2019

(65) Prior Publication Data
US 2020/0182673 A1 Jun. 11, 2020

(30) Foreign Application Priority Data

Dec. 6, 2018 (EP) ..................................... 18210743

(51) Int. Cl.
*G01F 11/02* (2006.01)
*F04B 13/00* (2006.01)
(52) U.S. Cl.
CPC ............ *G01F 11/029* (2013.01); *F04B 13/00* (2013.01)
(58) Field of Classification Search
CPC .............................. G01F 11/029; F04B 13/00
USPC ....................................................... 222/249
See application file for complete search history.

(56) References Cited

U.S. PATENT DOCUMENTS

| 4,173,437 | A | * | 11/1979 | Leka | ......................... F04B 1/02 417/521 |
| 2005/0095145 | A1 | * | 5/2005 | Hiraku | .................... F04B 49/06 417/254 |
| 2011/0164996 | A1 | * | 7/2011 | Imamura | ................. F04B 53/16 417/366 |
| 2014/0260565 | A1 | | 9/2014 | Imamura et al. | |
| 2018/0073502 | A1 | | 3/2018 | Huang et al. | |

FOREIGN PATENT DOCUMENTS

WO 2009022139 A1 2/2009

OTHER PUBLICATIONS

European Patent Office: "European Search Report" (EP 18210743); Mar. 5, 2019; EPO; Search report in corresponding European application.

* cited by examiner

*Primary Examiner* — Vishal Pancholi
(74) *Attorney, Agent, or Firm* — Bryan W. Bockhop; Bockhop Intelectual Property Law, LLC (57) ABSTRACT

A metering pump includes a chamber having a proximal portion and a distal portion. A piston is movable in the chamber. A drive drives the piston reciprocally form a proximal dead center to a distal dead center. The distal dead center is at the distal portion and the proximal dead center is located at the proximal portion. An outlet valve at the distal portion allows fluid flow from the chamber if the piston is moved in the distal direction and blocks a fluid flow into the chamber if the piston is moved into the proximal direction. A seal seals the chamber if the piston is positioned at the distal dead center. An inlet valve allows a flow of fluid into the chamber if the piston is moved in the proximal direction and blocks a fluid flow out of the chamber if the piston is moved in the distal direction.

20 Claims, 5 Drawing Sheets

MICROMETERING PUMP

CROSS-REFERENCE TO RELATED APPLICATION(S)

This application claims the benefit of EP Patent Application No. EP18210743.3, filed Dec. 6, 2018, the entirety of which is hereby incorporated herein by reference.

BACKGROUND OF THE INVENTION

1. Field of the Invention

The present invention relates to a metering pump that can draw a fluid from a source and dispense low volumes of fluid to a sink. The metering pump may dispense a predetermined volume of fluid that ranges from a few microliters to approximately 100 µl.

2. Description of the Related Art

In the prior art piston pumps are known to the person skilled in the art. A piston pump can draw a fluid from a source and pass the fluid to a sink. At an inlet of the piston pump an inlet check valve is connected to the chamber, in which the piston reciprocates. At the outlet of the chamber an outlet check valve is arranged.

The piston pumps according to the prior art suffer the disadvantage that a vacuum at the outlet valve may draw fluid from the source. Thereby, the fluid volume dispensed by the piston pump cannot be determined accurately.

Moreover, piston pumps of the prior art have a high clearance volume and cannot bleed a conduit connected between the inlet check valve and the source.

Further, dosing systems are known in the prior art. These dosing systems comprise a pusher that opens an opening for dispensing the fluid. As soon as the set volume of fluid is dispensed, the opening is close to by the pusher. These systems require a pressurized source or a pump between the fluid source and the pusher. These systems are undesired, since a pressurized source or the additional pump add to the complexity and volume of the metering system.

Dosing systems comprising a pusher closing an opening are known in WO 88/03052 A1, EP 1 674 163 A2, EP 1 721 681 A2 and EP 1 802 191 A1, for example.

SUMMARY OF THE INVENTION

It is an object of the present invention to provide a metering pump capable of reproducibly dispensing a predetermined volume of a fluid that is drawn from a source.

The object of the present invention is achieved by a metering pump and a metering system.

The present invention discloses a metering pump comprising a chamber having a proximal portion and a distal portion and a piston accommodated in the chamber and being movable from the proximal portion to the distal portion and vice versa. The metering pump further comprises a drive for driving the piston reciprocally from a proximal dead center to a distal dead center in the chamber. The distal dead center is located at the distal portion of the chamber. The proximal dead center is located at the proximal portion of the chamber. An outlet valve is located adjacent to the distal portion of the chamber. The outlet valve may be located opposite to the chamber. The outlet valve allows a flow of fluid from the chamber, if the piston is moved in the distal direction and blocks a fluid flow into the chamber, if the piston is moved into the proximal direction.

The metering pump further comprises a seal located at the distal portion of the chamber, wherein the seal located at the distal portion seals the chamber, if the piston is positioned at the distal dead center. The metering pump further comprises an inlet valve, wherein the inlet valve allows a flow of fluid into the chamber, if the piston is moved in the proximal direction, and blocks a fluid flow out of the chamber, if the piston is moved in the distal direction. The piston may contact the seal located at the distal portion in its distal dead center position.

The piston may engage elastically with the seal located at the distal portion in its distal dead center position. Particularly, the piston may elastically compress the seal located at the distal portion in its distal dead center position.

The metering pump has the advantage that it can draw a fluid, such as a liquid, from a source and can bleed and vent, respectively a conduit connected between the source and the inlet valve. Further, a vacuum in a conduit connected to the outlet valve cannot draw fluid from the chamber and the source.

The inlet valve may comprise an input opening and an output opening. The inlet valve allows a fluid flow from the input opening to the output opening, if the pressure at the output opening is lower than the pressure at the input opening and if the pressure at the input opening is lower or equal to the pressure in the environment of the metering pump.

The metering pump does not need a pressurized source or pump connected between the source and the input opening of the inlet valve. Thereby, complexity of the metering pump can be reduced.

An inlet channel of the metering pump may be connected to the inlet valve and the chamber, wherein the inlet channel is juxtaposed to the seal located at the distal portion of the chamber. Thereby, a low clearance volume is achieved, and the pump is able to bleed and vent, respectively the inlet conduit and a conduit connected to the inlet valve in a quick and reliable manner.

The drive may be arranged adjacent to a proximal portion of the chamber. The drive may comprise a linear drive, a solenoid, a servo drive, a linear motor or the like. Thereby, the piston can be positioned in arbitrary manner. Further, the piston travel can be adapted in an arbitrary manner.

The metering pump may comprise a first sub controller. The first sub controller is adapted to receive a command indicating the set volume of fluid to be dispensed by the metering pump. The first sub controller is further adapted to calculate the set number of reciprocating strokes such that the set volume of fluid is dispensed by the metering pump and that the piston is positioned at and/or in the seal located at the distal portion of the chamber, when the metering pump has dispensed the set volume of fluid. The first sub controller is further adapted to control the drive such that it reciprocates the piston the set number of reciprocating strokes. The first sub controller is also adapted to position the piston at and/or in the seal located at the distal portion of the chamber, if the piston has reciprocated the set number of reciprocating strokes. Particularly, the first sub controller is also adapted to position the distal end of the piston at and/or in the seal, if the piston has reciprocated the set number of reciprocating strokes. In this embodiment, the controller may control the drive such that the piston reciprocates the maximum piston stroke.

Since the piston is positioned at and/or in the seal located at the distal portion of the chamber after dispensing the fluid a vacuum in a conduit connected to the outlet valve cannot draw a fluid from the chamber and/or the source. Thereby, a set volume of fluid can be dispensed reliable.

The metering pump may further comprise a second sub controller. The second sub controller is adapted to receive a command indicating the volume of fluid to dispense. The second sub controller is adapted to calculate the piston travel of the piston such that the set volume of fluid is dispensed and that the piston is positioned at and/or in the seal located at the distal portion of the chamber, when the metering pump has dispensed the set volume of fluid. The second sub controller is further adapted to control the drive such that it reciprocates the piston in the proximal direction and in the distal direction the set piston travel. The second sub controller is also adapted to position the piston at and/or in the seal located at the distal portion of the chamber, if the piston has reciprocated the set piston travel and the set number of reciprocating strokes. Particularly, the second sub controller is also adapted to position the distal end of the piston at and/or in the seal located at the distal portion of the chamber, if the piston has reciprocated the set piston travel and the set number of reciprocating strokes. In this embodiment, the controller may control the drive such that the piston reciprocates less than the maximum piston stroke.

It is an advantage of the present invention that the piston travel may be adapted such that the piston is positioned at and/or in the seal located at the distal portion of the chamber after reciprocating the piston. Thereby, volumes smaller than the volume of the piston travel can be dispensed by the metering pump without sacrificing the sealed position of the piston after dispensing the predetermined volume of fluid. Independent of the volume of fluid to be dispensed the piston can be positioned at and/or within the seal located at the distal portion of the chamber. The piston is repositioned at and/or contacting the seal located at the distal portion of the chamber even if a fluid volume is dispensed that is lower than the maximum possible piston stroke or piston travel.

In one embodiment the controller may comprise the first sub controller and the second sub controller. The controller is adapted to receive a command indicating the volume of fluid to dispense. The controller is further adapted to calculate the set number of reciprocating strokes and the set piston travel of the piston such that the set volume of fluid is dispensed and that the piston is positioned at and/or in the seal located at the distal portion of the chamber, when the metering pump has dispensed the set volume of fluid. The controller is adapted to control the drive such that it reciprocates the piston in the proximal direction and the distal direction the set piston travel and the set number of reciprocating strokes. The controller is further adapted to position the piston at and/or contacting the seal located at the distal portion of the chamber, if the piston has reciprocated the set piston travel and the set number of reciprocating strokes.

In this embodiment the controller can adjust the piston travel to ensure that after dispensing the set amount of fluid by multiple strokes the piston is positioned at and/or in the seal located at the distal portion of the chamber or at (contacting) the seal located at the distal portion of the chamber. This can ensure that no fluid can be drawn from a vacuum and negative pressure, respectively in a conduit connected to the outlet valve from the chamber and/or source.

The controller may be adapted to change the piston travel between two piston strokes. In other words, the controller may be adapted to control the drive such that the drive reciprocates the piston during a first stroke a first piston travel and such that the drive reciprocates the piston during a second stroke a second piston travel, wherein the second piston travel is shorter than the first piston travel. Thereby, a large flow rate may be achieved, since all piston strokes except the last piston stroke have a large piston travel for dispensing a large amount of fluid and the last piston strokes has a lower piston travel to ensure that the correct volume is dispensed and that the piston is positioned at the seal located at the distal portion of the chamber after dispensing the set volume.

The inlet valve and the outlet valve may be a check valve.

The cylinder clearance volume may be lower than 5% of the piston displacement, preferably lower than 2% of the piston displacement, more preferred lower than 1% of the piston displacement. The clearance volume is located at the distal portion of the chamber, particularly between the distal dead center and the opening directed to the chamber of the outlet valve.

The volume metered by a single stroke with the maximum piston displacement ranges between approximately 5 µl to approximately 0.02 ml, preferably 4 µl to approximately 0.04 ml, more preferred between more than 0 µl to approximately 0.1 ml.

The controller may be adapted to control the minimum piston travel such that a single stroke of the piston meters a fluid volume from approximately 2 µl to approximately 5 µl, preferably from approximately 1 µl to approximately 3 µl, more preferred lower than approximately 1 µl to approximately 5 µl. The minimum piston travel is determined by the minimum step range or minimum instructable drive range of the drive.

The set volume to be output by the micro metering pump according to the present invention may range between approximately 1 µl to approximately 125 µl. The micro metering pump may output the set volume within a time span of approximately 1 sec. to 15 sec., preferably between approximately 1 sec and approximately 10 sec, more preferred between approximately 1 sec and approximately 5 sec.

The outlet valve comprises a valve seat accommodated in a body of the metering pump und a valve member being movable within and/or with respect to the valve seat. In one embodiment the piston contacts in its distal position (distal dead center) the valve member of the outlet valve, if the valve member of the outlet valve is in its closed position. Thereby, dead space can be further reduced. The valve seat of the outlet valve may be softer than the valve member of the outlet valve. The valve member of the outlet valve may be a valve plunger, a valve piston, a valve disk or the like.

In one embodiment, the seat of the outlet valve and the seal located at the distal portion of the chamber are formed integrally (in one piece). In this embodiment the valve seat of the outlet valve is softer than the valve member of the outlet valve.

The invention also discloses a metering system comprising the above described metering pump. The metering system comprises a fluid vessel coupled with the input opening of the inlet valve. The fluid vessel is the fluid source. The fluid vessel is filled with a fluid to be metered by the metering pump. The pressure in the fluid vessel corresponds to the pressure in the environment of the metering pump.

The present invention has the advantage that the fluid in the vessel does not have to be pressurized. The fluid vessel further comprises a vent opening being in fluid communication with the environment of the fluid vessel. The pressure in the environment of the fluid vessel corresponds to the pressure in the environment of the metering pump, since the fluid to be dispensed does not have to be pressurized in the fluid vessel.

The fluid to be metered may be a liquid, such as drinking water.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

The invention is now described with respect to the enclosed drawing showing a non-limiting and exemplary embodiment of the present invention, wherein.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The drawings are not drawn to scale and merely serve the purpose of understanding the principles of the invention. The geometric relationships, such as above, below, and the like, are merely used for explaining the principles of the invention and are not to be considered restricting.

Figure 1:
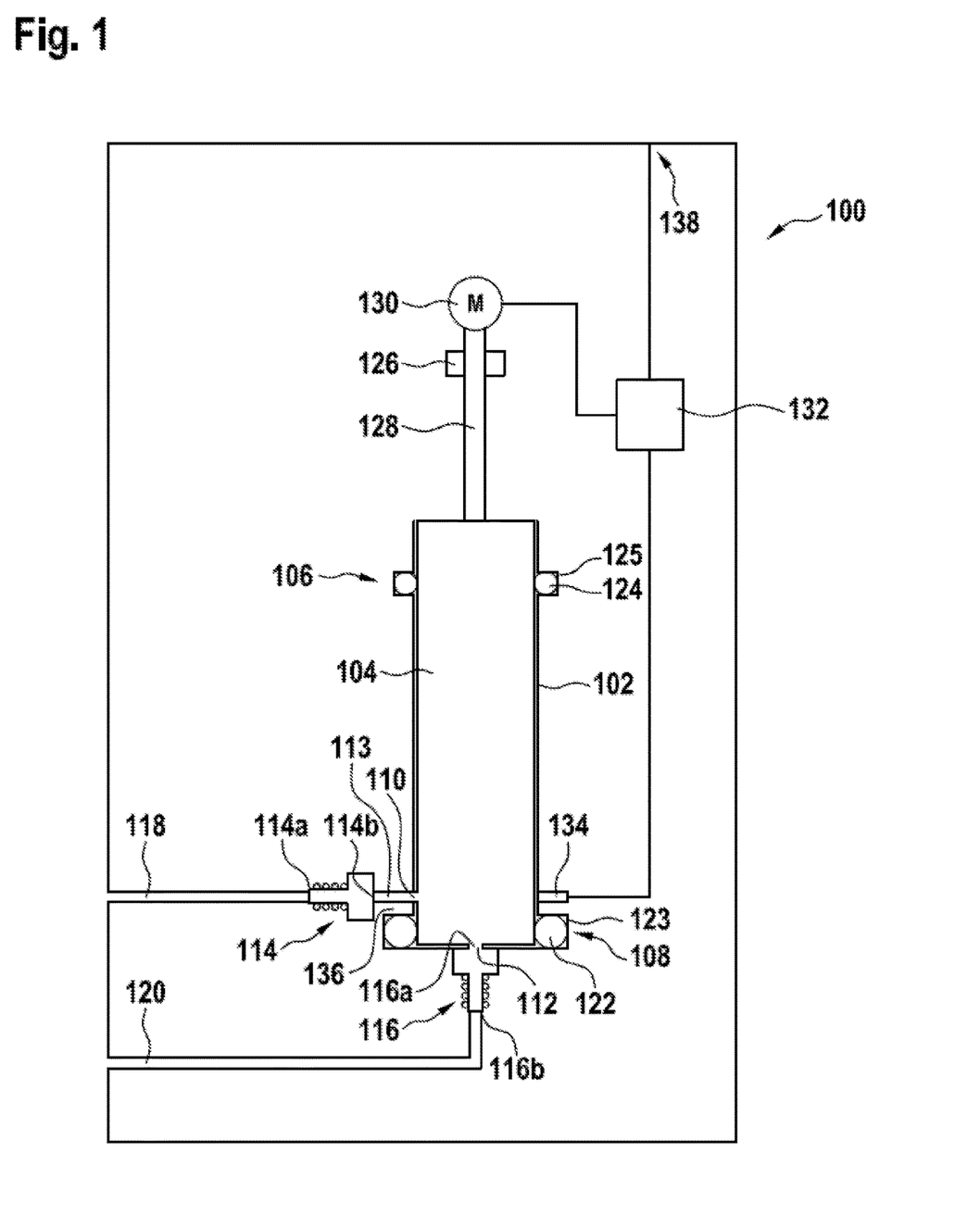
FIG. 1 shows a sectional view of the metering pump according to the invention.

Reference is made to FIG. 1 showing a schematic sectional view of the micrometering pump 100 according to the present invention. The pump 100 comprises an essentially cylindrical chamber 102 in which a piston 104 is arranged. The piston is shown at its distal dead center position 108. The piston 104 may reciprocate between the distal dead center 108 and a proximal dead center 106. The piston 104 is driven by a drive 130 that is coupled with the piston 104 by an arm 128. The arm 128 is guided in a guide 126.

The pump further comprises an inlet opening 110 in the chamber connected to an output opening 114b of an inlet valve 114. An input opening 114a of the inlet valve 114 is connected to an inlet conduit 118. The inlet valve 114 and the inlet opening 110 are formed adjacent to the distal dead center 108. Between the output opening 114b of the inlet valve 114 and the inlet opening 110 an inlet channel 113 is formed.

At the distal dead center 108 an outlet opening 112 is formed in the chamber 102. The outlet opening 112 is adjacent to an input opening 116a of an outlet valve 116. An output opening 116b of the outlet valve 116 is connected to an outlet conduit 120. The inlet valve 114 and the outlet valve 116 may be check valves.

At the distal dead center 108 a first seal 122 is arranged in the chamber 102. In the embodiment shown in FIG. 1 the first seal 122 is formed by an O-ring. If the piston 104 is positioned at the distal dead center 108 such that the distal portion of the piston 104 is arranged at and/or in the first seal 122 and/or contacting the first seal 122 and/or elastically compressing the first seal 122, a vacuum and negative pressure, respectively in the outlet conduit 120 cannot draw a fluid from the chamber 102, the inlet valve 114 and the inlet conduit 118 connected to a fluid source, such as a tank, particularly a tank filled with a liquid.

In the embodiment shown in FIG. 1 the seal 122 is arranged in a cylindrical recess 108 formed around the cylindrical chamber 102 at the distal dead center 108 of the piston 104. The recess 123 extends in the axial direction of the chamber 102 over a distance sufficiently to accommodate the first seal 122. The first seal 122 shall not have play within the recess 123 in the axial direction of the chamber 102. Preferably, the seal 122 is elastically compressed by the recess 123 in the axial direction of the chamber 102. If the piston 104 is positioned at the distal dead center 108 at and/or in the first seal 122, the first seal 122 is compressed in radial direction of the chamber 102 between the piston 104 and the radially outer surface of the recess 123.

In the distal dead center position 108 of the piston 104 as shown in FIG. 1 the piston 104 contacts the first seal 122. In the distal dead center position 108 of the piston 104 the piston compresses the first seal 122 elastically. Particularly, in the distal dead center position 108 of the piston 104 the piston compresses the first seal 122 elastically in the radial direction of the chamber 102. In the embodiment shown in FIG. 1 the piston 104 is positioned in the distal dead center position 108 within the O-ring forming the first seal 122.

At a proximal portion 106 of the chamber 102 a second seal 124 is positioned, wherein the second seal 124 contacts the piston 104. The second seal is accommodated in a second recess 125. The second seal 124 prevents that the piston 104 can leak fluid into the housing of the pump or draw fluid from the inside of the housing of the pump 110.

The first seal 122 and/or the second seal 124 may be an O-ring or a quadring.

The inlet 110 is arranged as close as possible to the first seal 122 and/or the distal dead center 108 of the piston 104 reciprocating within the chamber 102.

Between the first seal 122 and the inlet opening 110 a separation element 136 is arranged, separating the first seal 122 in axial direction of the chamber 102 from the inlet 110 of the chamber 102. The separation element 136 may extend in axial direction of the chamber 102 from approximately 0.1 mm to approximately 2 mm, preferably between 0.1 mm to approximately 1 mm, most preferred to approximately 0.1 mm to approximately 0.5 mm.

Since the inlet 110 is located as close as possible to the outlet 112 the pump 100 can bleed and vent, respectively the chamber 102, the inlet valve 114 and/or the inlet conduit 118 in a rapid and reliable manner.

The pump 100 further comprises a controller 132 connected to the drive 130 and a position sensor 134.

The position sensor 134 may determine the position of the piston 104. The sensor 134 may be an optical sensor, for example. Thereby, the controller can monitor appropriate movement of the piston 104 and detect a potential blocking of the piston 104. In one embodiment the pump 100 may comprise a travel sensor or path sensor for determining the actual position of the piston 104 and/or for determining the piston stroke traveled by the piston in a predetermined time span. This allows a more accurate control of the piston travel and allows a feedback loop for controlling the drive 130 and movement of the piston 104.

The controller 132 may be connected to a dispenser controller by an interface 138 supplying also electric energy to the controller 132.

The drive 130 may comprise a step motor, a linear drive, a solenoid, a servo drive, a linear motor and/or any drive that can arbitrarily position the piston. Thereby, the piston travel of the reciprocating piston 104 can be adjusted in a predetermined way. Further the reciprocation rate can be adjusted in a predetermined way. The minimum step range or minimum commandable travel range of the drive determines the minimum travel of the piston 104 during one stroke.

The maximum displacement of the piston 132 may range ranges from approximately 5 µl to approximately 0.02 ml, preferably from approximately 4 µl to approximately 0.04 ml, more preferred from approximately 2 µl to approximately 0.1 ml.

The controller 132 is adapted to control the minimum piston travel such that a single stroke of the piston 104 meters a volume from approximately 2 µl to approximately 5 µl, preferably from approximately 1 µl to approximately 3 µl, more preferred from approximately 1 µl to approximately 5 µl.

The cylinder clearance volume is lower than 5% of the piston displacement, preferably lower than 2% of the piston displacement, more preferred lower that 1% of the piston displacement. The clearance volume is essentially formed by the distance between the distal surface of the piston 104 at its distal dead center 108 and the distal surface of the chamber 102 and the inlet valve 114 and the outlet valve 112.

Figure 2:
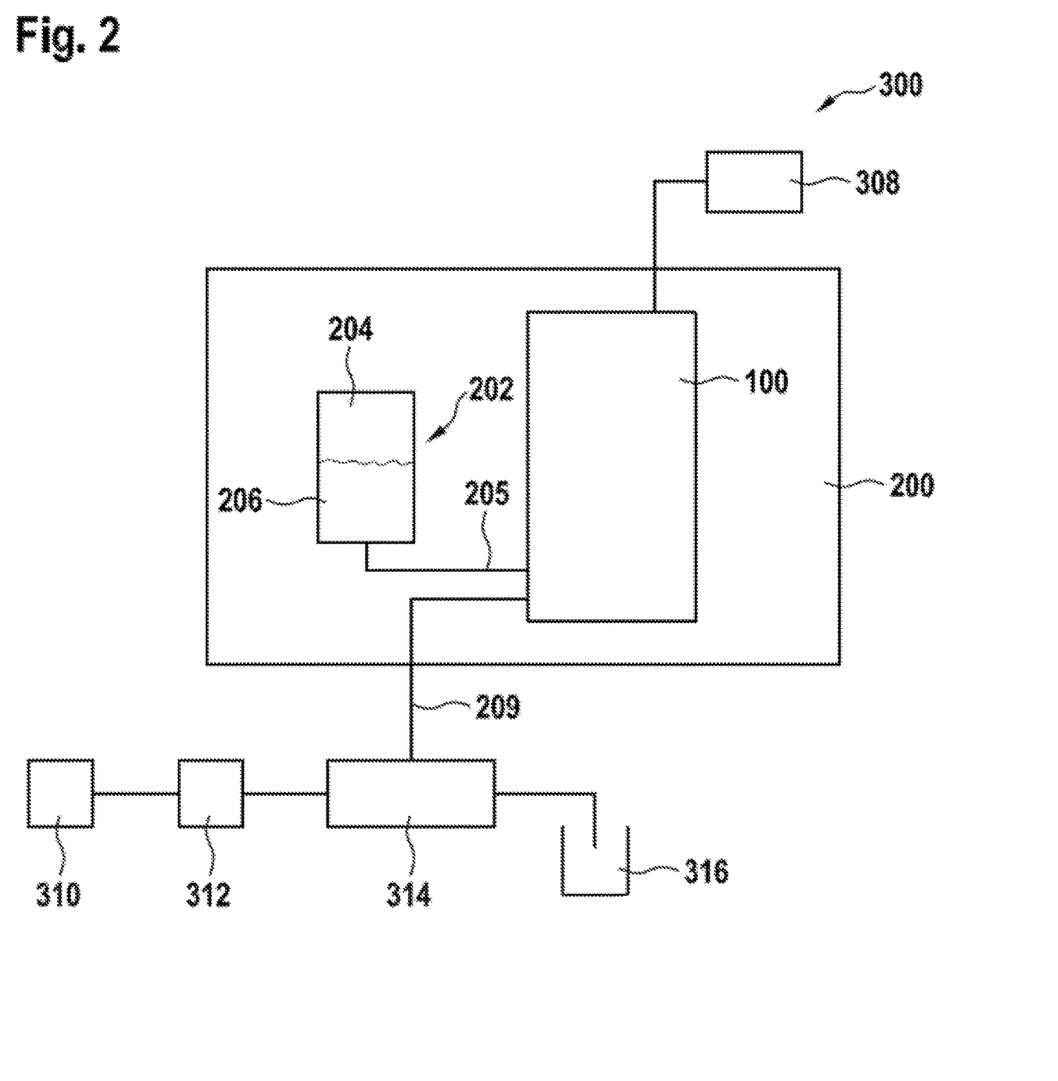
FIG. 2 shows a schematic view of a metering system according to the present invention.

Reference is made to FIG. 2 showing a schematic view of a metering system according to the present invention. The metering pump 100 described above is connected to a fluid tank 202 filled with a liquid 206. The fluid tank 202 comprises a vent opening. Thus, the pump 100 and the liquid 206 are exposed the same environment pressure.

During operation the piston 104 reciprocating in the cylinder 102 can bleed air from the chamber 102, the inlet valve 114, the inlet conduit 118 and a conduit 205 connected to the pump 100 and the fluid tank 202. As soon as bleeding of air in the fluid supply portion has been finished, the reciprocating piston dispenses fluid to an output conduit 209.

FIG. 2 also shows an application of the metering system 200 in a beverage dispenser 300. The beverage dispenser 300 may comprise a water source 310 such as a tap. A filter 312 is connected to the water source 312. The filter 312 filters the water from a water source and reduces minerals in the water. A mineralization device 314 is connected to the filter 312. The mineralization device 314 adds minerals to the water after filtering. After the water has passed the mineralization device 314 the beverage is dispensed into a user vessel 316 such as a glass.

The beverage dispenser 300 also comprises a dispenser controller 308. The dispenser controller 308 transmits to the controller 132 of the pump 100 the volume of liquid 206 that is to be metered to the mineralization device 314. The liquid 206 may be a mineralization liquid for adding minerals to the demineralized water, such that the water output by the mineralization device 314 is suitable for drinking by humans. Alternatively or additionally, the liquid may comprise trace elements. The beverage output by the beverage dispenser may be water.

Figure 3:
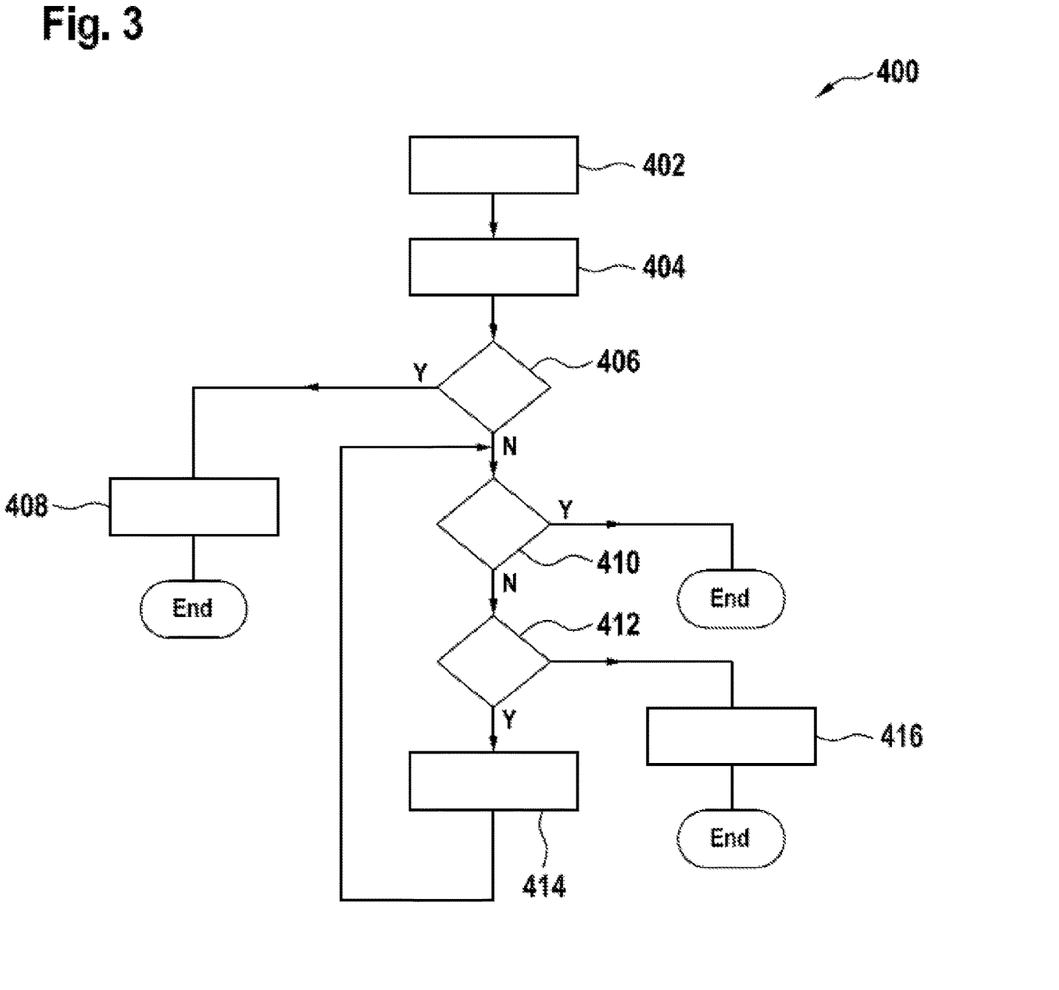
FIG. 3 shows a flowchart of a method for operating the metering pump according to the present invention.

Reference is made to FIG. 3 showing an exemplary embodiment for using the metering pump and/or metering system according to the present invention in an exemplary application.

In step 402 the dispenser controller 308 transmits to the controller of the pump 100 the volume of liquid to be dispensed by the pump 100.

In step 404 the controller 132 calculates how many piston strokes and which piston travel is necessary to dispense the set volume of liquid as instructed by the dispenser controller 308. In one embodiment, the controller 132 may calculate the number of necessary piston strokes by instructing the piston 104 to reciprocate with the maximum piston travel and a final stroke with a shorter piston travel in order to dispense the remaining volume. The number of piston strokes and the set volume can be calculated according to the following formula:

Set volume to dispense=(number of piston strokes−1)×volume dispensed by maximum piston travel+volume dispensed by the last piston stroke;

In another embodiment the controller 132 can instruct the drive 130 to reciprocate the piston 104 with a constant piston travel until the set volume is dispensed.

In step 406 the method verifies, whether a constant piston travel shall be used for each stroke or not. If a constant piston travel shall be applied to each stroke, the method proceeds to step 408 and instructs the drive 132 reciprocate the piston 104 the set piston travel and the set number of strokes. Thereafter, the method ends.

If the method determines in step 406 that the piston 104 shall reciprocate as often as possible with the maximum piston travel, the method proceeds from step 406 to step 410. The method determines in step 410 whether the set volume has been dispensed.

If the set volume has not been dispensed, the method proceeds from step 410 to step 412. The method determines in step 412, whether the difference between the set volume to meter is larger than the actual metered volume.

If the method determines that the difference between the set volume to meter is larger than the actual metered volume, the method proceeds from step 412 to step 414. In step 414 the controller 132 instructs the drive 130 to reciprocate the piston 104 with the maximum available piston travel.

The method returns to step 410 and verifies, whether the set volume has been metered by the pump 100. If the method determines that the set volume has been determined, the method ends. If the set volume has not been metered, the method proceeds to step 412 and determines, whether the difference between the set volume to meter and the actual metered volume is larger than the volume that can be metered by a maximum piston travel. If the difference is larger, the method continues with step 414 as described above and the loop formed by steps 410, 412 and 414.

As soon as the method detects in step 412 that the difference between the set volume to meter and the actual metered volume is lower than the volume that can be metered by a maximum piston travel, the method proceeds to step 416. In step 416 the controller 132 instructs the drive 130 to reciprocate the piston in the chamber 102 with a stroke having a piston travel shorter than the maximum piston travel. Thereafter, the method ends.

The volume metered by a stroke of the reciprocating piston 104 is the product of the sectional area of the piston 104 and the actual piston travel. If the piston 104 has a cylindrical shape, the actual metered volume of fluid is the product of the cylinder base of the piston 104 multiplied by the actual piston travel. Thereby, the controller 132 can determine how many strokes and/or which piston travel is necessary to meter a set volume of fluid.

It is been noted, that the method according to FIG. 3 can also be applied if a set volume has to be metered that is smaller than the maximum piston travel. In this case, the piston 104 has to reciprocate only for a single stroke with a piston travel shorter than the maximum piston travel.

Figure 4:
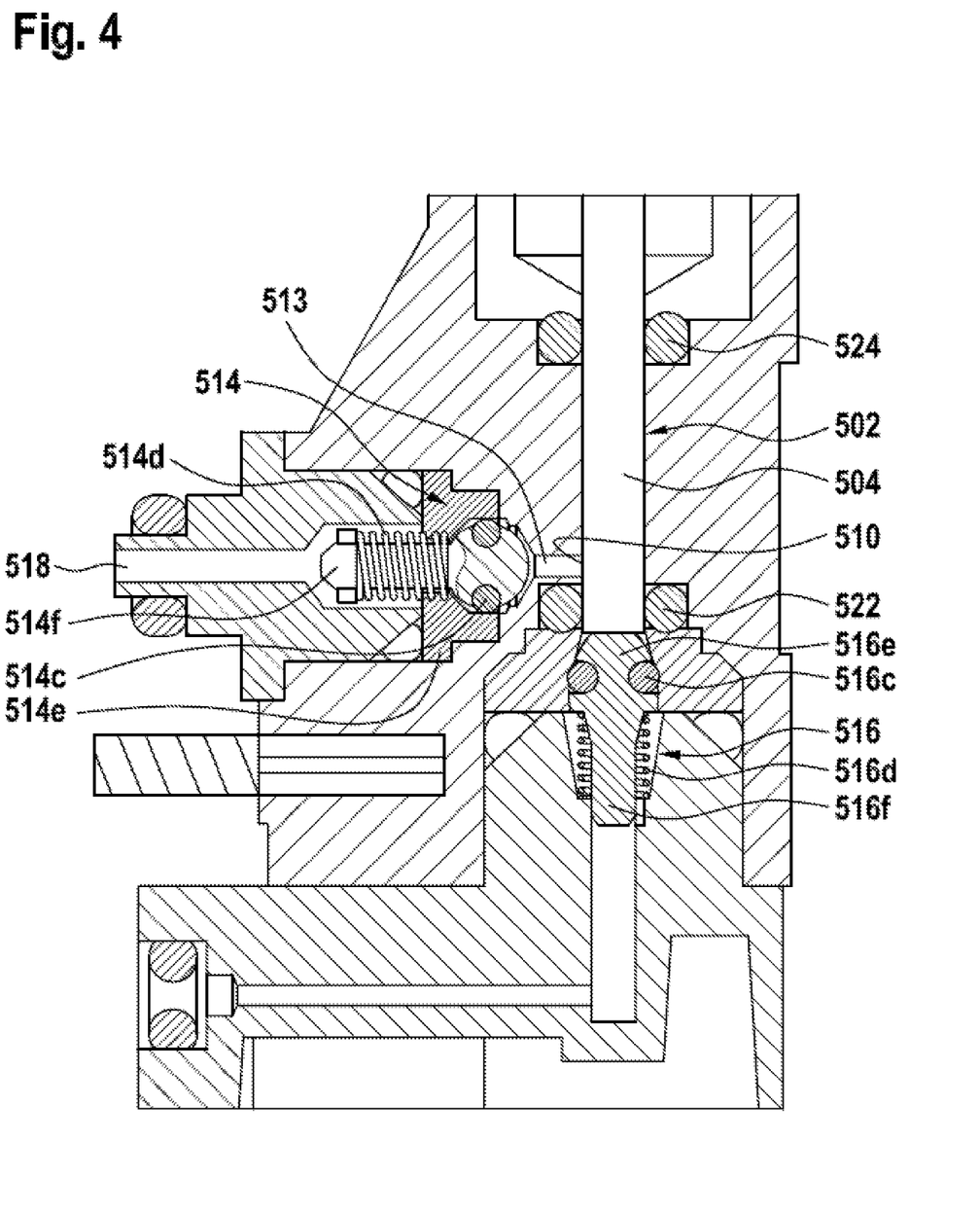
FIG. 4 shows a second embodiment of a valve arrangement.

Reference is made to FIG. 4 showing a second embodiment in detail. The second embodiment generally corresponds to the first embodiment and corresponding features are identified by corresponding reference numerals, wherein a summand of 400 has being added to the reference numerals according to figure one. A piston 504 is accommodated in a cylinder 502. The piston is sealed by a first seal 522 and a second seal 524 within the chamber 502. The first seal 522 and the second seal 524 may be an O-ring or a quad ring.

The inlet valve 514 is connected to a conduit 518, which is connected to a liquid source. The output of the inlet valve 514 is connected by a conduit 513 with the chamber 502. A movable valve member 514$f$ is biased by a spring 514$b$ into a closed position against the valve seat 514$e$.

As soon as the piston 504 moves from the distal position shown in FIG. 4 into the proximal position the valve member 514$f$ is moved away from the valve seat 516$e$ against the bias of the spring 514$d$ and fluid can flow viral the conduits 518, 513 into the chamber 502. As soon as the piston 504 is moved in the proximal direction, the fluid presses the valve member 514$f$ against the valve seat 514$e$. In the embodiment shown in FIG. 4 the valve element 514$f$ comprises a circumferential groove in which an O-ring 514$c$ is accommodated. In the embodiment shown in FIG. 4 the O-ring 514$c$ comprises a higher elasticity than the valve seat 514$e$.

The outlet valve 516 comprises a linearly movable valve member 516$f$ that is biased by a spring 516$d$ against a valve seat 516$e$. In the closed position shown in FIG. 4 the valve member 516$f$ of the outlet valve 516 contacts the distal end of the piston 504, if the piston is moved into the distal dead center position. Thereby any fluid flows through the first seal 522, the valve seat 516$e$ and the valve member 516$f$ may be prevented.

In the embodiment shown in FIG. 4 the valve element 516$f$ comprises a circumferential groove in which an O-ring 516$c$ is accommodated. In this embodiment the O-ring 516$c$ comprises a higher elasticity as compared with the valve seat 516$e$.

Figure 5:
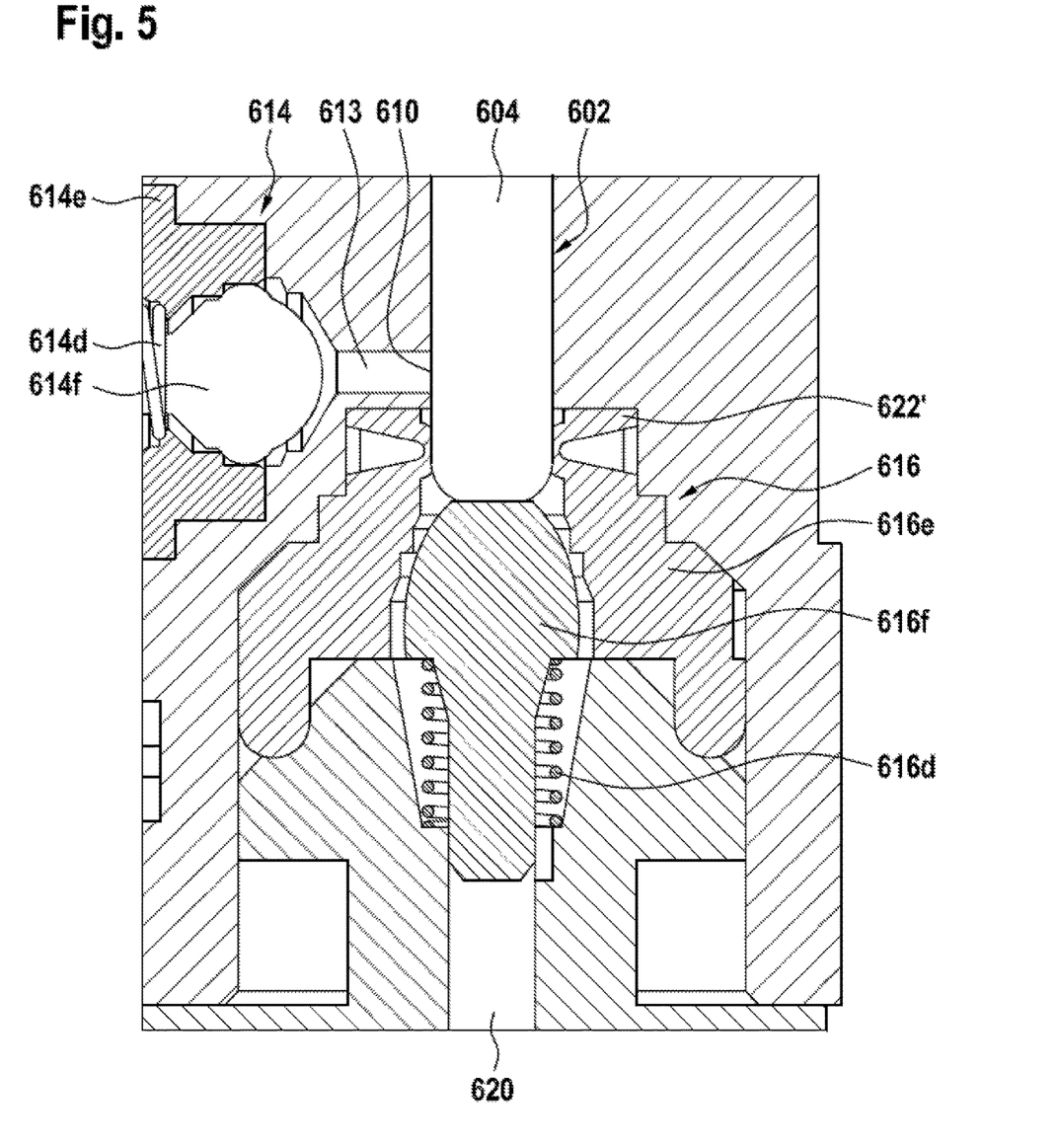
FIG. 5 shows a third embodiment of a valve arrangement.

Reference is made to FIG. 5 showing a third embodiment of the pump according to the present invention. The third embodiment generally corresponds to the first embodiment, wherein like features are identified by like reference numerals, wherein a summand of 500 has been added to the reference numerals of FIG. 1. An inlet valve 614 comprises a movable valve member 614$f$ that is biased by a spring 614$d$ against the valve seat 614$e$. The valve member 614$f$ comprises a lower elasticity as compared to the valve seat 614$e$.

If the piston 604 is moved within the chamber 602 in the distal direction, the valve member 614$f$ is released from the valve seat 614$e$ and a fluid may flow through the conduit 613 and the opening 610 into the chamber. If the piston 604 is moved into the distal direction, the fluid presses the valve element 614$f$ against the valve seat 614$e$.

The outlet valve 616 comprises a movable valve member 616$f$ that is biased by a spring 616$d$ against a seat 616$e$. If the piston 604 is moved within the chamber 602 into the distal direction, the fluid in the chamber 602 presses against the valve member 616$f$ and releases the valve member 616$f$ from the valve seat 616$e$ against the bias of the spring 616$d$ and fluid may flow out of the chamber 602 into a conduit 620. In the distal position (distal dead center position) the distal end portion of the piston 604 contacts the surface of the valve member 616$f$ that is directed to the piston 604. Thereby, flow of fluid from the chamber 602 through the outlet valve 616 into the conduit 620 may be prevented.

In the embodiment shown in FIG. 5 the first seal 622' accommodated around the distal end of the piston 604 is formed integrally (in one piece) with the seat 616$e$ of the outlet valve 616.

This embodiment, the valve seat 616$e$ comprises a higher elasticity as compared to the movable valve element 616$f$.

Since the valve seat 616$e$ and the first seal 622' around the distal portion of the piston are formed in one piece manufacturing cost may be reduced and leakage of fluid from the chamber 602 may be prevented.

It is an advantage of the present invention that a vacuum at the outlet of the pump 104 cannot draw liquid to be metered from the chamber 102, the inlet valve 114 an inlet conduit 118 and a fluid source 206. Further, the present invention allows that the pump and all devices connected at the inlet side of the pump 100 are bled in a rapid and reliable manner, although the pump is actually designed to accurately dispense small volumes of liquid.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:
1. A metering pump, comprising:
a chamber having a proximal portion and a distal portion;

a piston accommodated in the chamber and being movable in the chamber;

a drive for driving the piston reciprocally form a proximal dead center to a distal dead center in the chamber, wherein the distal dead center is located at the distal portion of the chamber and the proximal dead center is located at the proximal portion of the chamber;

an outlet valve located adjacent to the distal portion of the chamber, wherein the outlet valve allows a flow of fluid from the chamber, if the piston is moved in the distal direction, and blocks a fluid flow into the chamber, if the piston is moved into the proximal direction; and a seal located at the distal portion of the chamber, wherein the seal seals the chamber, if the piston is positioned at the distal dead center and the distal end of the piston contacts the seal, wherein the seal is located at the distal dead center position of the piston and wherein the distal portion of the piston compresses the seal elastically in the distal dead center position of the piston; and an inlet valve, wherein the inlet valve allows a flow of fluid into the chamber, if the piston is moved in the proximal direction, and blocks a fluid flow out of the chamber, if the piston is moved in the distal direction.

2. A metering pump, comprising:

a chamber having a proximal portion and a distal portion;

a piston accommodated in the chamber and being movable in the chamber;

a drive for driving the piston reciprocally form a proximal dead center to a distal dead center in the chamber, wherein the distal dead center is located at the distal portion of the chamber and the proximal dead center is located at the proximal portion of the chamber;

an outlet valve located adjacent to the distal portion of the chamber, wherein the outlet valve allows a flow of fluid from the chamber, if the piston is moved in the distal direction, and blocks a fluid flow into the chamber, if the piston is moved into the proximal direction; and a seal located at the distal portion of the chamber, wherein the seal seals the chamber, if the piston is positioned at the distal dead center and contacts the seal;

an inlet valve, wherein the inlet valve allows a flow of fluid into the chamber, if the piston is moved in the proximal direction, and blocks a fluid flow out of the chamber, if the piston is moved in the distal direction;

a first sub controller;

wherein the first sub controller is adapted to:

receive a command indicating the set volume of fluid to dispense;

to calculate the set number of reciprocating strokes such that the set volume of fluid is dispensed and that the piston is positioned at the seal, when metering pump has dispensed the set volume of fluid;

control the drive such that it reciprocates the piston the set number of reciprocating strokes; and to position the piston at the seal, if the piston has reciprocated the set number of reciprocating strokes.

3. The metering pump according to claim 2, wherein:

the inlet valve comprises an input opening and an output opening; and the inlet valve allows a fluid flow from the input opening to the output opening, if the pressure at the output opening is lower than the pressure at the input opening and if the pressure at the input opening is lower or equal to the pressure in the environment of the metering pump.

4. The metering pump according to claim 2, further comprising an inlet channel connected to the inlet valve and the chamber, wherein the inlet channel is juxtaposed to the seal.

5. The metering pump according to claim 2, wherein the drive comprises a drive selected from a list consisting of:

a step motor;
a linear drive;
a solenoid;
a servo drive; and
a linear motor.

6. The metering pump according to claim 2, further comprising a second sub controller;

wherein the second sub controller is adapted to receive a command indicating the volume of fluid to dispense;

calculate the piston travel of the piston such the set volume of fluid is dispensed and that the piston is positioned at the seal, when metering pump has dispensed the set volume of fluid;

control the drive such that it reciprocates the piston in the proximal direction and in the distal direction the set piston travel; and to position the piston at the seal, if the piston has reciprocated the set piston travel and the set number of reciprocating strokes.

7. The metering pump according to claim 2, further comprising a controller comprising the first sub controller and second sub controller;

wherein the controller is adapted to receive a command indicating the volume of fluid to dispense;

calculate the set number of reciprocating strokes and the set piston travel of the piston such that the set volume of fluid is dispensed and that the piston is positioned at the seal, when the metering pump has dispensed the set volume of fluid;

control the drive such that it reciprocates the piston in the proximal direction and in the distal direction the set piston travel and the set number of reciprocating strokes; and to position the piston at the seal, if the piston has reciprocated the set piston travel and the set number of reciprocating strokes.

8. The metering pump according to claim 7, wherein the controller is adapted to control the drive such that drive reciprocates the piston during a first stroke a first piston travel and such that drive reciprocates the piston during a second stroke a second piston travel, wherein the second piston travel is shorter than the first piston travel.

9. The metering pump according to claim 2, wherein at least one of the inlet valve and the outlet valve is a check valve.

10. The metering pump according to claim 2, further comprising a cylinder in which the piston reciprocates, the cylinder having a cylinder clearance volume that is lower than 5% of displacement of the piston.

11. The metering pump according to claim 2, wherein the volume metered by a single stroke with a maximum piston displacement ranges in one of the following:

approximately 5 µl to approximately 0.02 ml;
approximately 4 µl to approximately 0.04 ml; and
approximately 2 µl to approximately 0.1 ml.

12. The metering pump according to claim 7, wherein controller is adapted to control the minimum piston travel such that a single stroke of the piston meters a volume in one of the following ranges:
approximately 2 µl to approximately 5 µl;
approximately 1 µl to approximately 3 µl;
approximately 1 µl to approximately 5 µl.

13. A metering pump, comprising:
a chamber having a proximal portion and a distal portion;
a piston accommodated in the chamber and being movable in the chamber;
a drive for driving the piston reciprocally form a proximal dead center to a distal dead center in the chamber, wherein the distal dead center is located at the distal portion of the chamber and the proximal dead center is located at the proximal portion of the chamber;
an outlet valve located adjacent to the distal portion of the chamber, wherein the outlet valve allows a flow of fluid from the chamber, if the piston is moved in the distal direction, and blocks a fluid flow into the chamber, if the piston is moved into the proximal direction; and
a seal located at the distal portion of the chamber, wherein the seal seals the chamber, if the piston is positioned at the distal dead center and contacts the seal;
an inlet valve, wherein the inlet valve allows a flow of fluid into the chamber, if the piston is moved in the proximal direction, and blocks a fluid flow out of the chamber, if the piston is moved in the distal direction, wherein:
the outlet valve comprises a valve seat accommodated in a body of the metering pump and a valve member being movable with respect to the valve seat; and
the piston contacts in its distal position the valve member of the outlet valve, if the valve member of the outlet valve is in its closed position.

14. The metering pump according to claim 13, wherein:
the outlet valve comprises a valve seat accommodated in a body of the metering pump and a valve member being movable with respect to the valve seat; and
the seat of the outlet valve and the seal located at the distal portion of the chamber are formed integrally.

15. A metering system, comprising:
the metering pump according to claim 13, and
a fluid vessel coupled with the input opening of the inlet valve;
wherein the fluid vessel is filled with a fluid to be metered by the metering pump; and
the pressure in the fluid vessel corresponds to the pressure in the environment of the metering pump.

16. The metering system according to claim 15, wherein:
the fluid vessel further comprises a vent opening being in fluid communication with the environment of the fluid vessel; and
the pressure in the environment of the fluid vessel corresponds to the pressure in the environment of the metering pump.

17. The metering system according to claim 15, wherein the fluid to be metered is a liquid.

18. The metering pump according to claim 13, wherein:
the inlet valve comprises an input opening and an output opening; and
the inlet valve allows a fluid flow from the input opening to the output opening, if the pressure at the output opening is lower than the pressure at the input opening and if the pressure at the input opening is lower or equal to the pressure in the environment of the metering pump.

19. The metering pump according to claim 13, further comprising an inlet channel connected to the inlet valve and the chamber, wherein the inlet channel is juxtaposed to the seal.

20. The metering pump according to claim 13, wherein the drive comprises a drive selected from a list consisting of:
a step motor;
a linear drive;
a solenoid;
a servo drive; and
a linear motor.

* * * * *